UNITED STATES PATENT OFFICE.

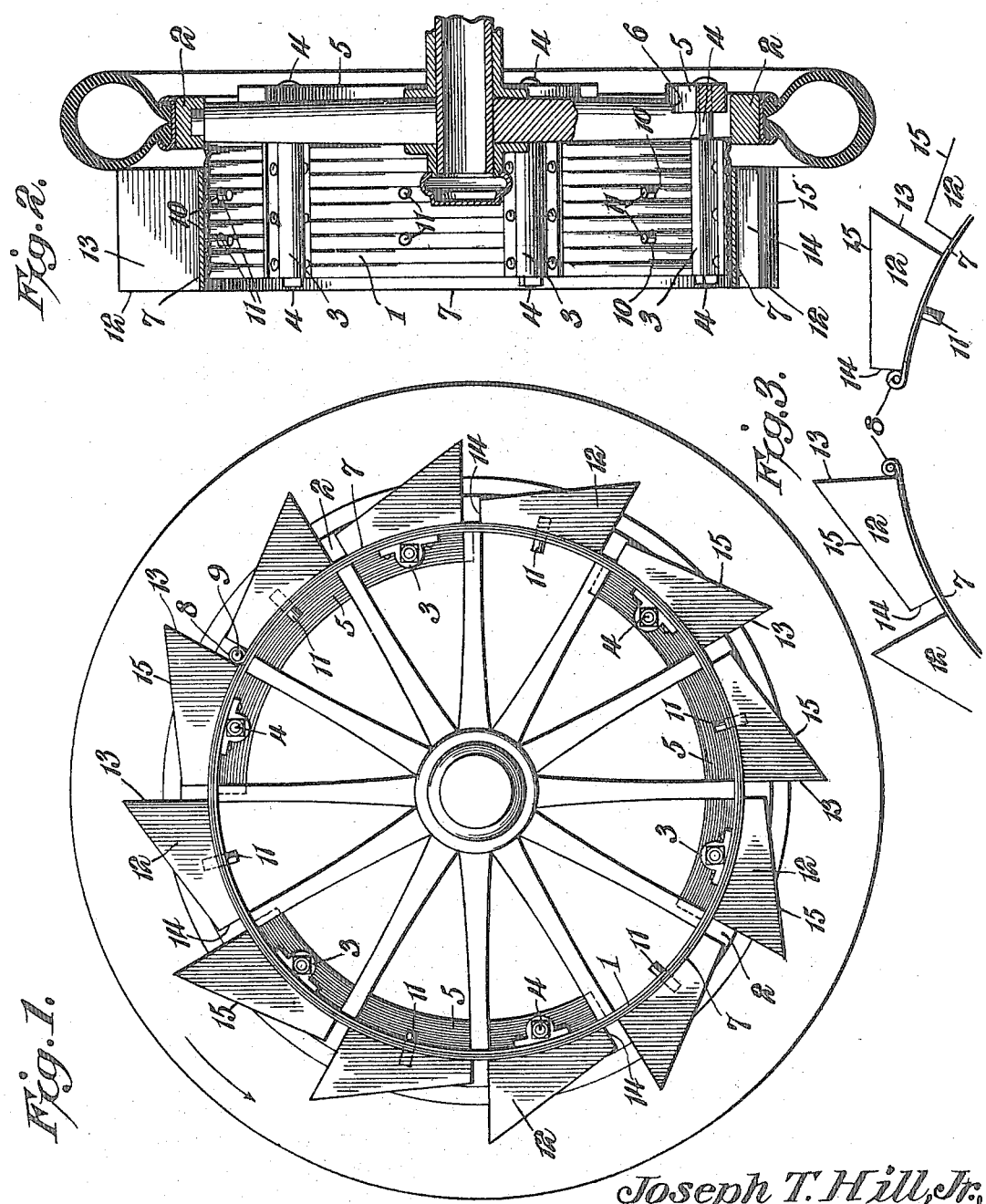

JOSEPH THOMAS HILL, JR., OF EVANSVILLE, INDIANA.

TRACTION ATTACHMENT FOR MOTOR-DRIVEN VEHICLES.

1,197,290. Specification of Letters Patent. Patented Sept. 5, 1916.

Application filed September 27, 1915. Serial No. 52,914.

*To all whom it may concern:*

Be it known that I, JOSEPH T. HILL, Jr., a citizen of the United States, residing at Evansville, in the county of Vanderburg and State of Indiana, have invented a new and useful Traction Attachment for Motor-Driven Vehicles, of which the following is a specification.

This invention relates to traction attachments for vehicle wheels.

The object is to provide a device which may be readily applied to the rear or driving wheels of vehicles, and particularly motor-propelled vehicles, to render them capable of passing safely over soft, muddy or sandy ground, and which may be as easily detached from the same, when the necessity for the use of the device is no longer present.

Another object is to provide a traction attachment for automobiles which will not come in contact with the ground or roadbed when the same is hard, but will be supported in spaced relation thereto by the tire of the wheel, and thus will not interfere with the speed and running of the machine. In addition to these advantageous features, the device is capable of application to the driving wheels of an automobile without the necessity of any material alteration thereto.

A full and complete understanding of the invention may be obtained from a careful consideration of the following detailed description, taken in connection with the accompanying drawing forming a part of this specification; it being understood that while the drawing shows a practical form of the invention, the latter is not confined to strict conformity therewith, but may be changed or modified, as long as such changes or modifications mark no material departure from the salient features of the invention, as specifically pointed out in the claims hereto appended.

In the drawing, in which like reference characters designate like parts in each of the several figures:—Figure 1 is a side elevation of an automobile wheel, having the present invention applied thereto. Fig. 2 is a vertical transverse sectional view through the same. Fig. 3 is a detail view of a portion of the removable shoe-carrying band.

Referring to the drawings, there is shown an ordinary automobile wheel comprising the usual hub structure, spokes, felly, rim, and pneumatic tire, to which is adapted to be applied my improved traction attachment.

An annular metallic band 1, preferably corrugated circumferentially to increase its strength, is employed, and is adapted to fit against the spokes of the wheel on the outside thereof, and is of a diameter to fit snugly within the inner diameter of the felly 2, and may be of a width approximately equal to or a little greater than the width of the pneumatic tire. Spaced eyes 3 are provided on the inner face of the corrugated band 1, and are riveted or otherwise securely fastened thereto, and are provided with bores for the reception of transverse bolts 4, which pass between the spokes of the wheel, and engage on the opposite side of said spokes with arcuate clamping members 5, which are suitably bored to receive the bolts 4 and are also recessed, as shown at 6, to partially surround spokes and to assist in preventing any relative movement of the said members upon the wheel. These clamping members 5 may be formed of light hard wood or metal of sufficient strength to withstand the strain of the clamping bolts 4 and, while shown in the drawings as being three in number (Fig. 1), it is to be understood that more or less may be employed for the purpose of clamping the band 1 to the wheel. In the present instance, each clamping member 5 is held by two bolts 4, and an intervening space is provided between the ends of the same.

A flexible split steel ring 7 is adapted to fit snugly over the band 1 and is of less width, having its ends formed into interfitting eyes 8 for the reception of a bolt 9, for the purpose of securing the ends of the split ring together at a convenient point around the band 1. The band 1 is suitably perforated as at 10 for the reception of spaced pins 11, which are carried by the split ring 7 and enter the perforations and extend slightly beyond the inner face of the band 1 radially to the axis of the wheel, and act to prevent any relative movement between the band 1 and ring 7. These pins 11 are preferably located between every other pair of spokes of the wheel and alternate with the clamping bolts 4. Any other suitable interlocking means between the band and the ring may be substituted therefor.

A plurality of outstanding shoes 12 are suitably secured around the outer face of the split ring 7, and are adapted, when the device is in its applied position on the wheel, to contact at their outer extremities at the inner sides with the adjacent face of the pneumatic tire. The outer extremities of the shoes 12 are approximately in a line with the transverse center of the tire, and are thus spaced away from the ground upon which the vehicle may be traveling, provided the ground is sufficiently hard to support the vehicle in the proper manner. The shoes 12, which may be formed of some strong material, and made either of solid or hollow structure, have a rear relatively high radial wall 13, a short front radial wall 14, and an outer inclined wall 15 connecting the rear and front walls 13 and 14 and arranged tangentially to the supporting split ring 7. In other words, each shoe has two radial walls or faces, one of greater length than the other, and an outer connecting inclined wall or face which is tangential to a circle struck from the axis of the wheel; the point of juncture of said outer face with the longer radial face being substantially opposite the circumferential middle line of the tire. The shoes are spaced apart on the ring so that the rear wall of one shoe will be in advance of the front wall of the next adjacent shoe.

The application of the device to an automobile drive wheel is simple and needs no further description. It will be seen that by removing the nuts from the bolts 4, the entire device including the band 1, ring 7 and shoes 12 may be removed therefrom and the same, together with the clamping members 5, may be conveniently carried on the car and applied for use when bad roads are encountered.

When the automobile has sunken into a soft place in the road, the shoes 12 will be more or less embedded therein, and upon the rotation of the wheel in the direction of the arrow in Fig. 1, the flat tangential outer faces 15 of the shoes 12 will be brought into contact with the surface of the soft ground, one after another, thus having a tendency to lift or step the wheel out of the mud or sand, the tangential outer walls 15 acting to support the weight of the car by presenting increased bearing surface to the ground.

From the foregoing it will be seen that a traction attachment for motor-propelled vehicles has been provided which is simple in its application to the wheel and is of such a structure as to permit of its being manufactured at a low cost, while at the same time provision has been made for sufficient strength and durability to obviate the danger of becoming easily broken or put out of order.

What is claimed is:—

1. A traction attachment for motor-driven wheels, comprising a circumferential support secured to one side of the wheel, a ring adapted to be locked to the support, and provided on its outer face with a series of spaced shoes having their outer extremities in a circumferential line of a lesser radius than the radius of the tire tread.

2. A traction attachment for motor-driven wheels, comprising an annular band secured to one side of the wheel, a ring adapted to be locked around the band, and a series of radially-disposed spaced shoes carried by the ring, each shoe having one of its radial faces of greater length than the other, and an outer inclined connecting face tangential to a circle struck from the axis of the wheel, the point of juncture of said outer face with the longer radial face being substantially opposite the circumferential middle line of the tire.

3. A traction attachment for motor-driven wheels, comprising an annular band secured to one side of the wheel, a ring adapted to be locked around the band, and a series of radially-disposed spaced shoes carried by the ring, each shoe having one of its radial faces of greater length than the other, and an outer inclined connecting face tangential to a circle struck from the axis of the wheel.

4. In a traction attachment, the combination with a motor vehicle drive wheel, of an annular supporting band adapted to fit within the inner periphery of the felly and abut against one side of the spokes and to extend outwardly therefrom, spaced eyes carried on the inner face of the band, arcuate clamping members abutting against the opposite side of the spokes, attaching bolts passing through the clamping members between the spokes and through the eyes, spaced apertures provided in the band, a split ring adapted to be placed around the band and having means for clamping the same in position, inwardly directed pins carried by the ring and fitting in the said apertures, and lugs or shoes projecting radially from the ring and having one of the outermost lateral edges of each shoe formed at an acute angle and located at a greater distance from the axis of the wheel than the other lateral edge and within the diameter of the tire tread.

5. In a traction attachment, the combination with a motor vehicle drive wheel, of a continuous flat circular supporting band of less diameter than the felly, said band outstanding from one side of the wheel and removably secured thereto, a shoe-carrying ring surrounding the band and having means for detachably securing the same thereon, and radially disposed spaced shoes secured to the ring and having their rear active edges arranged within the diameter of the tire tread and at a greater distance from the axis of the wheel than their front edges.

6. A traction attachment for motor-driven wheels, comprising a plurality of radially-disposed shoes, each having a rear relatively high radial wall, a short front radial wall, and an outer inclined wall connecting the front and rear walls, said shoes being spaced apart so that the rear wall of one shoe will be in advance of the front wall of the next adjacent shoe, and means for supporting the shoes on the wheel at one side thereof in a manner so that the outer extremities of the shoes will terminate short of the outer periphery of the tread of the tire.

7. In a traction attachment, the combination with a motor vehicle drive wheel, of a circumferential support secured to the wheel and projecting at one side thereof, a shoe-carrying ring surrounding the support and having means for detachably securing the same thereon, and radially disposed spaced shoes secured to the ring and having their rear active edges arranged within the diameter of the tire tread and at a greater distance from the axis of the wheel than their front edges.

In testimony that I claim the foregoing as my own, I have hereto affixed my signature in the presence of two witnesses.

JOSEPH THOMAS HILL, Jr.

Witnesses:
J. C. TIXKELLEACH,
J. T. HILL, Sr.